(12) United States Patent
Liu et al.

(10) Patent No.: US 7,177,637 B2
(45) Date of Patent: Feb. 13, 2007

(54) CONNECTIVITY TO PUBLIC DOMAIN SERVICES OF WIRELESS LOCAL AREA NETWORKS

(75) Inventors: Jiewen Liu, San Diego, CA (US); Shahrnaz Azizi, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 253 days.

(21) Appl. No.: 10/090,136

(22) Filed: Mar. 1, 2002

(65) Prior Publication Data

US 2004/0192264 A1 Sep. 30, 2004

(51) Int. Cl.
*H04Q 7/20* (2006.01)
*H04M 1/66* (2006.01)

(52) U.S. Cl. .............. 455/426.1; 455/41.2; 455/411; 455/435.2; 455/456.5

(58) Field of Classification Search .............. 342/457, 342/463; 370/331, 338
See application file for complete search history.

(56) References Cited

U.S. PATENT DOCUMENTS

| 5,818,824 | A | * | 10/1998 | Lu et al. ............... 370/328 |
|---|---|---|---|---|
| 6,112,097 | A | * | 8/2000 | Subhankar ............... 455/462 |
| 6,259,405 | B1 | * | 7/2001 | Stewart et al. ............ 342/457 |
| 6,301,475 | B1 | * | 10/2001 | Saarela et al. ............ 370/350 |
| 6,477,156 | B1 | * | 11/2002 | Ala-Laurila et al. ....... 370/331 |
| 6,732,176 | B1 | * | 5/2004 | Stewart et al. ............ 709/227 |
| 6,829,480 | B1 | * | 12/2004 | Hoglund et al. ........... 455/433 |
| 2002/0022483 | A1 | * | 2/2002 | Thompson et al. ........ 455/439 |
| 2002/0075844 | A1 | * | 6/2002 | Hagen ..................... 370/351 |

FOREIGN PATENT DOCUMENTS

DK EP0641137 A2 * 8/1994
GB EP0505106 A2 * 3/1992

* cited by examiner

*Primary Examiner*—Fan Tsang
*Assistant Examiner*—Lisa Hashem
(74) *Attorney, Agent, or Firm*—Blakely, Sokoloff, Taylor & Zafman LLP

(57) ABSTRACT

A method and/or apparatus to permit non-authorized wireless mobile devices access to public domain services of a local area network. One embodiment of the invention provides a wireless access point device, with a wireless port and a wired network port, with at least two modes of operation to permit authorized mobile devices access to network services and non-authorized mobile devices access to a particular set of network services. A list of free and/or pay-per-use network services is provided to non-authorized mobile devices to select the desired service(s). For pay-per-use services, a mobile device user can provide a form of payment for validation.

34 Claims, 5 Drawing Sheets

WLAN Service Information

- Internet Explorer                              (pay)

- Departure/Arrival Information        (free)

- Airport Services                              (free)

- Ground Transportation                  (free)

CONNECTIVITY TO PUBLIC DOMAIN SERVICES OF WIRELESS LOCAL AREA NETWORKS

FIELD

The invention relates to wireless local area networks. In particular, one embodiment of the invention relates to a method, machine-readable medium, and apparatus for providing simple access to public computer network services to non-authorized wireless local area network users.

BACKGROUND

Wireless local area networks (WLAN) have developed to provide communication capabilities to various types of mobile devices. Such communication capabilities enable mobile devices to communicate with other devices in the network and beyond.

A typical WLAN has an interface point or access point (AP) to enable communications to, from, and/or between wireless devices within its network. An AP is the point of entry for wireless devices or mobile units (MU) into a network infrastructure. Additionally, an AP may itself be communicatively coupled to other network(s) including a wired network. Thus, an AP may manage communications between itself and other devices within its wireless network, communications between devices within its wireless network, and act as a bridge or gateway for communications between devices within its network and devices outside of its networks (e.g., devices on a wired network).

One type of WLAN has been specified in the Institute of Electrical and Electronics Engineers (IEEE) Standard 802.11-1997 and subsequent revisions. In an IEEE 802.11 compliant wireless network, various services are provided to establish and manage communications between an AP and MUs. Generally, an MU is registered, pre-subscribed, or otherwise authorized to access and/or communicate over the WLAN through the AP. For example, a WLAN may be deployed within a corporation. The corporation wishes to protect its computers and data that can be accessed over the network. Thus, an AP may limit access to the network to only pre-authorized MUs. A first mobile unit, being a pre-authorized device, would be allowed to communicate over the network. Meanwhile, a second mobile unit would be denied access to the network since it is not a pre-authorized device.

A typical network access protocol for an IEEE 802.11 compliant WLAN is herein described. Upon start-up or initialization, an MU with an IEEE 802.11 compliant interface attempts to find an existing WLAN infrastructure. The MU may listen to the information broadcasted by a WLAN station or AP. This information would allow the MU to locate AP, and then possibly to join its network. The MU may also start by sending out a message to solicit such information from a WLAN station or AP. The MU may then listen for a response from AP. The AP receiving such a request responds by sending a message with information that will allow the MU to locate the WLAN infrastructure. Once the MU has found an infrastructure, it may choose to join the WLAN by synchronizing its parameters.

If the MU decides to join a WLAN, it then proceeds by authentication/association handshakes. The authentication process is a mechanism for the MU to prove its identity. The IEEE 802.11 1997 WLAN specification supports two authentication services, Open System and Shared Key. These services function as low-level interfaces to negotiate access to the WLAN. Recent extensions of the IEEE 802.11 supports more enhanced authentication methods to improve security. Open System authentication is a default, null authentication procedure or algorithm. This procedure involves identity assertion, request for authentication, and an authentication result. Typically, an MU is already a network member, provides a password, and/or is pre-registered, in order to obtain access to the WLAN and its services via the authentication interface. Other authentication algorithms typically require MUs to know a secret key. The secret key may be delivered to an MU over a secure channel that may be protocol independent of the IEEE 802.11 standard (e.g., the IEEE 802.1x standard for instance).

Association is the mechanism through which an IEEE 802.11 compliant WLAN provides transparent mobility to stations or APs. Once a station successfully completes authentication/association handshakes with an AP, it may begin exchanging data frames with the AP and accessing network services.

BRIEF DESCRIPTION OF THE DRAWINGS

FIG. 2 illustrates an exemplary menu of various pay and free public domain services that may be provided to a mobile unit.

DETAILED DESCRIPTION OF THE INVENTION

Figure 1:
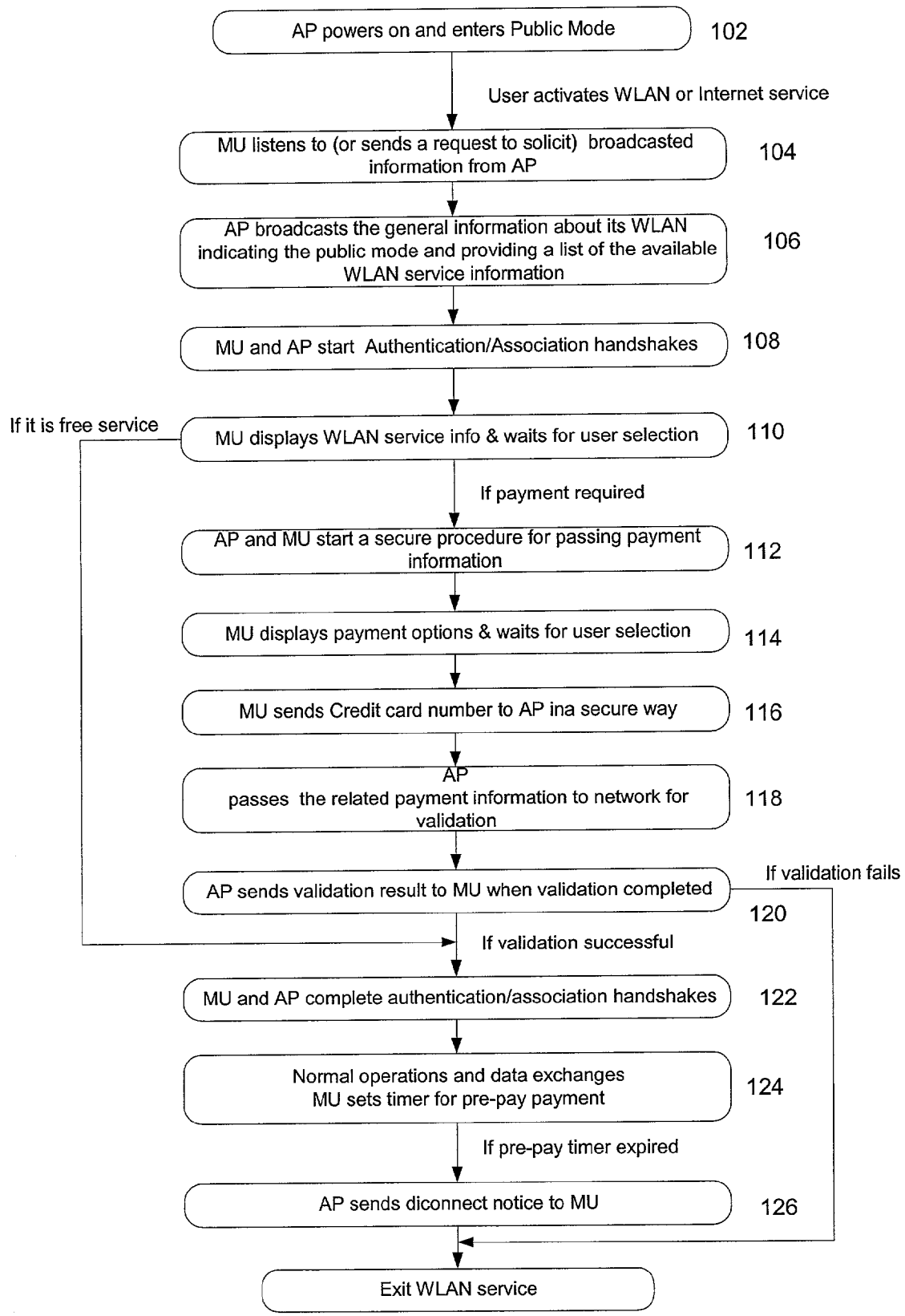
FIG. 1 illustrates one method of implementing public mode access according to one embodiment of the invention.

In the following detailed description of the invention, numerous specific details are set forth in order to provide a thorough understanding of the invention. However, the invention may be practiced without these specific details. In other instances well known methods, procedures, and/or components have not been described in detail so as not to unnecessarily obscure aspects of the invention.

Throughout this description, the term 'mobile unit' (MU) generally refers to any device with a wireless communication interface that may be used to access a WLAN. Additionally, the term 'authorization' generally refers to any pre-subscription or authentication scheme whereby a prior registration, password, and/or relationship is established to permit an MU to gain access to a network. Conversely, the term 'non-authorized' generally refers to MU or users that have no prior registration, agreement, and/or authority to access a network. The term 'public domain' generally refers to both free and/or pay-per-use network services that made available to non-authorized MUs and/or users. The term 'network services' generally refers to access to various data, information, applications, and/or communication interfaces provided by a network. In the context in which it is employed herein, network services may refer to services provided by a wireless and/or wired network.

One aspect of the invention provides a novel scheme that permits non-authorized MUs to access public or limited regions of a network. In one implementation, this enables an IEEE 802.11 compliant WLAN to provide access to services of its own network (e.g. a wireless network) and/or of other networks (e.g. a wired network) to non-authorized wireless devices.

Generally, conventional WLANs implementations restrict access to network services (e.g. wireless network services and/or wired network services) to authorized users or MUs. This may be accomplished in a number of ways. In one implementation access to the WLAN is restricted to authorized MUs only by requiring secret key access during authentication. In other implementations, a higher-level access restriction scheme may be employed. This higher-level access restriction scheme may necessitate that the MU continuously provide some security identification, authentication password or key, or that the MU be known (or pre-registered) to the AP network beforehand.

One aspect of the invention provides multiple access modes through an AP to permit both authorized and non-authorized MUs to access network services. According to one implementation, an AP has two modes of operation, private mode and public mode.

In private mode, the AP and MU first implement Secure Service, as specified in the IEEE 802.11 (or its supplements) specification, including authentication and encryption to ensure secure communications over the WLAN. Then, the AP provides full network access/ functionality to the MU consistent with the IEEE 802.11 Standard WLAN specification.

In public mode, an AP provides non-authorized MUs access to public network services. Establishing a connection between an MU and AP in public mode differs from how a connection is established in private mode.

Generally, connection establishment between an AP and MU refers to completing authentication and association handshakes regardless of their order. For instance, in one embodiment authentication may be performed prior to association, while in another embodiment authentication may be performed after association.

An AP operating in public mode may provide non-authorized MUs access to network services by first initiating a simple registration process.

According to one aspect of the invention, the Open System and/or other authentication procedures are supplemented to provide non-authorized MUs free and/or pay-per-use access to certain WLAN services. The network services available to non-authorized MUs are provided to the user for selection. In this manner, non-authorized MUs may access a number of network services while restricting access to private network services (such as those belonging to a corporation) to authorized MUs only.

FIG. 1 illustrates one method of implementing public mode access according to one embodiment of the invention. An AP may be pre-configured or dynamically configured to operate in public mode 102. This may occur at start-up or boot-up for example. An MU then sends a request to obtain basic connection information (or the MU awaits for such information) 104. The AP responds to the request by indicating its mode of is operation (either public mode or private mode) 106.

In one implementation, the AP operating in public mode responds by indicating public mode operation and providing the available WLAN service information 106. The WLAN services available in public mode may also be referred to as public domain services.

In public mode, the MU and AP may then process authentication information 108 to establish an initial connection with the AP.

Once the initial connection has been established, the MU displays the WLAN public domain services available and waits for user selection 110. FIG. 2 illustrates an exemplary menu of various pay and free public domain services that may be displayed on an MU.

If the public domain services are freely accessible, once the user selects a service the, network connection will be established and normal operation of the selected service(s) may begin 122. An AP terminates access to network services by sending a disconnect notice 126. In this manner, a non-authorized MU may obtain access to public domain services of a network, while allowing other network services to be secure from unauthorized access.

If the user selects a pay-for-use public domain service, then some form of payment will be requested. In one implementation, secure services are provided to safeguard the transaction 112. Different forms of payment options may be displayed by the MU to enable a user to provide payment 114. The AP and MU employ a secure scheme 112 to prevent easy access to payment information (e.g. credit card number, etc.) during transmission from the MU to the AP. In various embodiments, a user may provide payment via credit card, prepaid services (e.g. prepaid phone-card), and/or other forms of remote or direct payment methods.

Once an AP receives payment information 116 (e.g. credit card number), it passes this information to other network components for validation 118 in a secure way. Validation is the process of checking the validity of the form of payment sent by the MU to the AP as payment for a pay for use service. The AP is informed of the validation results. The AP, in turn, sends the result to the MU 120.

If the form of payment is determined to be valid, the connection of the MU to the selected service 124 through an AP 122 is established.

If a prepaid payment form is used, a timer is maintained to monitor the amount of time the service is employed. If the prepaid time is exceeded, then service is terminated. In one implementation, the MU maintains a timer to indicate the amount of prepaid time used or remaining. In another implementation, a timer is maintained by the AP, enabling the AP to terminate access to network services if the prepaid time has been exhausted. In other implementations, the AP may terminate access to public domain network services if such access has exceeded an allotted amount of time and/or if network traffic reaches a threshold level (e.g. to alleviate network congestion).

Figure 3:
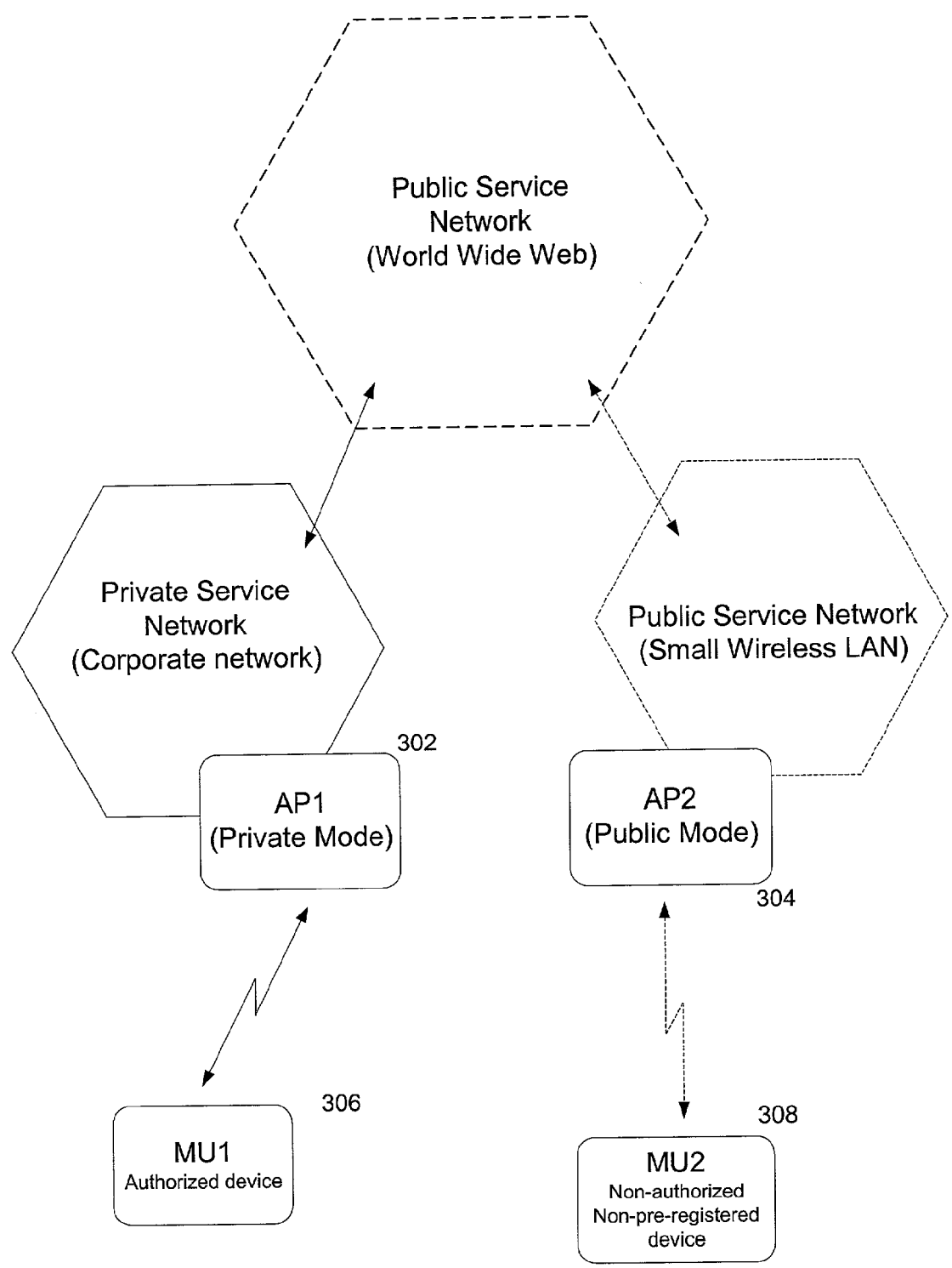
FIG. 3 illustrates one embodiment of the invention that provides multiple access modes through multiple access points to permit both authorized and non-authorized mobile units to access network services.

FIG. 3 illustrates one embodiment of the invention that provides multiple access modes through multiple access points to permit both authorized and non-authorized MUs to access network services. A first access point AP1 302 is communicatively coupled to a network and configured to operate in private mode and provide network services (e.g. pre-registered) to authorized MUs (e.g. MU1 306). A second access point AP2 304 is communicatively coupled to the same network and configured to operate in public mode and provide public domain service(s) (e.g. free or pay-per-use) to non-authorized MUs (e.g. MU2 308).

Figure 4:
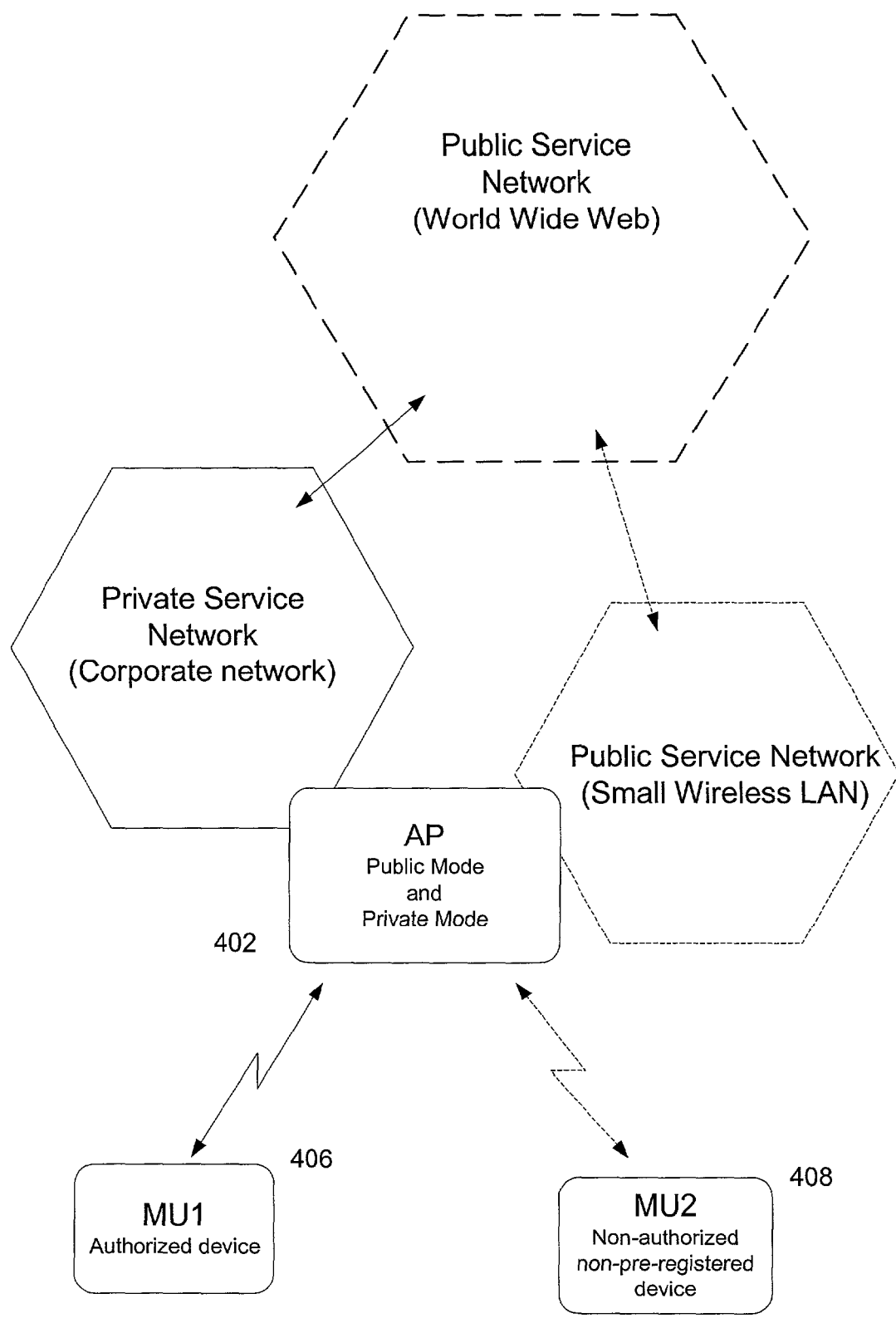
FIG. 4 illustrates another embodiment of the invention that provides multiple access modes through a single access point to permit both authorized and non-authorized mobile units to access network services.

FIG. 4 illustrates another embodiment of the invention that provides multiple access modes through a single access point to permit both authorized and non-authorized MUs to access network services. An access point AP 402 is communicatively coupled to a network and configured to provide both private mode network service(s) (e.g. pre-registered) to authorized MUs (e.g. MU1 406) and public mode service(s) (e.g. free or pay-per-use) to non-authorized MUs (e.g. MU2 408). In one embodiment, AP 402 may have a single wireless communication port (e.g. a wireless transceiver port) concurrently supporting both public and private mode communications and/or services. In another embodiment, AP 402 may have two separate wireless communications ports (e.g. wireless transceiver ports), a first port to support public mode communications and/or services and a second port to support private mode communications and/or services.

Figure 5:
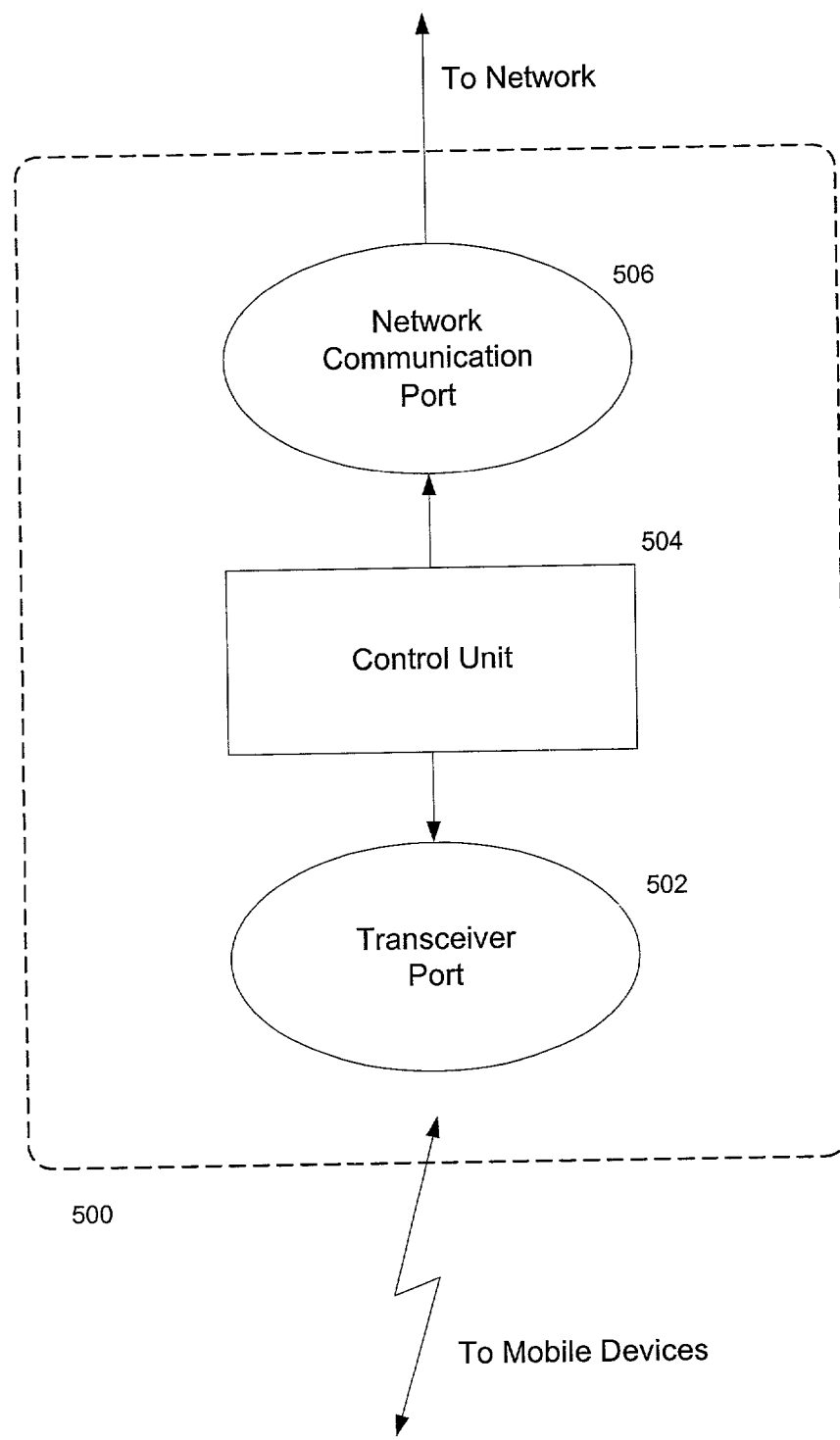
FIG. 5 illustrates a block diagram of one embodiment of an access point device according to one aspect of the invention.

FIG. 5 illustrates one embodiment of an access point AP device 500 according to one aspect of the invention. A transceiver port 502 serves to wirelessly transmit and receive information from mobile devices and/or users. The wireless transceiver port 502 is coupled to a control unit 504 that controls communications/access between the transceiver port 502 and a network communications port 506 (unit 504 is also handles 802.11 protocol). The network communications port 506 to couple to a wired or wireless network. Through both the transceiver port 502 and network communications point 506, the access point device 500 acts as a gateway for wireless/mobile devices to access network services.

In a first mode of operation (e.g. private mode), the access point device 500 permits authorized mobile devices access to the network communications port 506 and the network services provided by the network coupled to the network communications port 506. In this mode of operation, only mobile devices that are pre-authorized or are members of the network may obtain access to network services via the network communications port 506.

In a second mode of operation (e.g. public mode), the access point device 500 permits non-authorized mobile devices access to the network communications port 506 and the public domain network services provided by the network coupled to the network communications port 506.

The access point device is configured to provide non-member or non-authorized MUs a list of available public domain (e.g. free or pay-per-use) network services. The MU user may select from the list of public domain services and thus obtain access to the selected services. If a pay-per-use network service is selected, then the access point device 500 provides a mechanism to validate such payment information prior to permitting the MU access to the selected network service. The access point device 500 may request that the MU user provide a form of payment (e.g. credit card number, prepaid card, etc.). Upon receiving said payment information, the access point device 500 validates the form of payment to ascertain that it is bona fide. The access point device 500 may employ network services, over the network communications port 506, to validate the payment information.

The access point device 500 communicates with MUs in accordance with the Electrical and Electronics Engineers (IEEE) Standard 802.11 Specification. In particular, authentication and privacy services may be provided via the procedures defined in IEEE Standard 802.11 and/or any of its supplement Specifications.

In another embodiment, the access point device 500 may operate to provide both authorized and non-authorized MU (e.g. members and non-members) access to network services at the same time. As before, authorized MUs are provided extensive access to network services while non-authorized MUs are only allowed access to public domain network services.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications are possible. For instance, while the invention has been described in the context of the IEEE 802.11 standard, it may also be implemented with other communication standards, such as Hyperlan I and Hyperlan II (specified by the European Telecommunications Standardization Institute). Additionally, it is possible to implement the invention or some of its features in hardware, programmable devices, firmware, software or a combination thereof. For instance, all or parts of the methods described herein may be performed by a processor within an AP and/or MU. The invention or parts of the invention may also be embodied in a processor-readable storage medium or machine-readable medium such as a magnetic, optical, or semiconductor storage medium.

What is claimed is:

1. A method comprising:
   broadcasting a synchronization signal from a wireless access point device indicating one of a plurality of modes of operation for the access point, the plurality of modes of operation including a private mode of operation for authorized devices and a public mode of operation for authorized or non-authorized devices;
   broadcasting available public network services if the mode of operation is the public mode of operation;
   receiving a request for establishment of a connection from a non-authorized mobile device in response to the broadcast of a synchronization signal for the public mode of operation; and
   establishing a connection between the non-authorized mobile device and the access point device;
   wherein establishing a connection in the private mode comprises use of a secure authentication process, and wherein establishing a connection in the public mode comprises use of a registration process.

2. The method of claim 1 further comprising:
   receiving a request from the non-authorized mobile device for access to a selected network service of the available network services; and
   allowing the non-authorized mobile device access to the selected network service.

3. The method of claim 1, wherein the available network services include free public network services.

4. The method of claim 1, wherein the available network services include pay-per-use public network services.

5. The method of claim 4 further comprising:
   providing a form of payment for a pay-per-use network service.

6. The method of claim 5 wherein the form of payment is a credit card number.

7. The method of claim 5 wherein the form of payment is a prepaid payment number.

8. The method of claim 5 further comprising:
   providing a secure transmission of information between the non-authorized mobile device and the access point device.

9. The method of claim 5 further comprising:
   sending payment information from the non-authorized mobile device to the access point device wirelessly.

10. The method of claim 5 further comprising:
   validating the payment information provided by the non-authorized mobile device; and
   providing the validation results to the non-authorized mobile device.

11. The method of claim 10 further comprising:
establishing a connection between the non-authorized mobile device and a selected network service only if payment validation is successful.

12. The method of claim 11 further comprising:
if a payment for the non-authorized mobile device expires, disconnecting the non-authorized mobile device from a selected network service of the available network services.

13. The method of claim 1 further comprising:
performing data exchanges between the non-authorized mobile device and a selected network service of the available network services through the access point.

14. The method of claim 1 further comprising:
disconnecting the non-authorized mobile device from the access point device to terminate access to the available network services.

15. The method of claim 1 wherein the establishment of the connection uses an authentication procedure provided in the Electrical and Electronics Engineers (IEEE) Standard 802.11 Specification or its supplements.

16. A machine-readable medium having one or more instructions for enabling a non-authorized user to wirelessly access a number of network services, which when executed by a processor, causes the processor to perform operations comprising:
wirelessly transmitting a synchronization signal indicating one of a plurality of modes of operation for an access point, the plurality of modes of operation including a private mode of operation for authorized devices and a public mode of operation for authorized or non-authorized devices;
wirelessly transmitting available network services if the mode of operation is the public mode of operation;
receiving a request for connection establishment from a non-authorized user in response to the transmission of a synchronization signal for the public mode of operation;
establishing a connection with the non-authorized user;
receiving a request for access to a selected network service, from among the available network services, by the non-authorized user; and
providing the non-authorized user access to the selected network service;
wherein establishing a connection in the private mode comprises use of authentication and association handshakes, and wherein establishing a connection in the public mode comprises use of a registration process.

17. The machine-readable medium of claim 16 further comprising:
requesting a form of payment from the non-authorized user for access to pay-per-use network services.

18. The machine-readable medium of claim 17 further comprising:
validating the payment information provided by the non-authorized user.

19. The machine-readable medium of claim 18 further comprising:
if payment from the non-authorized mobile device expires, disconnecting the non-authorized mobile device from the selected network service.

20. The machine-readable medium of claim 16 further comprising:
performing data exchanges between the non-authorized user and the selected network service.

21. An apparatus comprising:
a transceiver port for wirelessly communicating with mobile devices;
a network communications port communicatively coupled to the transceiver port, the network communications port for coupling to a network; and
a control unit coupled to the transceiver port and the network communications port, the control unit configured to control access from the transceiver port to the network communications port and provide at least two modes of operation, a first mode of operation to provide authorized mobile devices private access to the network communications port, and a second mode of operation to provide authorized and non-authorized mobile devices public access to the network communications port
wherein the control unit is to use the transceiver port to broadcast a synchronization signal indicating one of the modes of operation and, for the second mode of operation, available network services, and to receive a response from an unauthorized mobile device in response to the broadcast of the synchronization signal; and
wherein the control unit is to establish a connection in the private mode through use of authentication and association handshakes, and to establish a connection in the public through use of a registration process.

22. The apparatus of claim 21 wherein any one of the operation modes can be dynamically enabled or disabled.

23. The apparatus of claim 21 wherein in the first mode of operation a specific authentication process is requested from the mobile devices to obtain full network access over the network communications port and in the second mode of operation no specific authentication process is requested from the mobile devices to obtain certain network access over the network communications port.

24. The apparatus of claim 21 wherein the second mode of operation allows the non-authorized mobile devices to obtain public network access through the network communication port.

25. The apparatus of claim 21 wherein the control unit is configured to provide secure services to both authorized and non-authorized mobile devices.

26. The apparatus of claim 21 wherein the control unit is configured to provide data exchange to both authorized and non-authorized mobile devices utilizing an authorization process provided in the Electrical and Electronics Engineers (IEEE) 802.11 Standard or its supplements.

27. The apparatus of claim 21 wherein the control unit is configured to provide a third mode of operation, the third mode of operation provides authorized mobile devices access to the network communications port and non-authorized mobile devices limited access to the network communications port simultaneously.

28. The method of claim 1, wherein the private mode of operation includes a secure service as specified in the Electrical and Electronics Engineers (IEEE) Standard 802.11 Specification or its supplements.

29. The method of claim 1, wherein the plurality of modes of operation includes a simultaneous mode of operation, the simultaneous mode of operation providing authorized mobile devices access to private network services and authorized or non-authorized mobile devices access to public network services simultaneously via the access point device.

30. The machine-readable medium of claim 16, wherein the private mode of operation includes a secure service as specified in the Electrical and Electronics Engineers (IEEE) Standard 802.11 Specification or its supplements.

31. The machine-readable medium of claim 16, wherein the plurality of modes of operation includes a simultaneous mode of operation, the simultaneous mode of operation providing authorized mobile devices access to private network services and authorized or non-authorized mobile devices access to public network services simultaneously via the access point.

32. The method of claim 15, wherein:
the establishment of a connection in the private mode comprises use of Secure Service procedures as specified in IEEE Standard 802.11 Specification or its supplements; and
the establishment of a connection in the public mode comprises use of Open System procedures as specified in IEEE Standard 802.11 Specification or its supplements.

33. The machine-readable medium of claim 16, wherein:
the establishment of a connection in the private mode comprises use of Secure Service procedures as specified in the Electrical and Electronics Engineers (IEEE) Standard 802.11 Specification or its supplements; and
the establishment of a connection in the public mode comprises use of Open System procedures as specified in the IEEE Standard 802.11 Specification or its supplements.

34. The apparatus of claim 26, wherein the control unit is configured to:
establish a connection in the private mode through use of Secure Service procedures as specified in IEEE Standard 802.11 Specification or its supplements; and
establish a connection in the public mode through use of Open System procedures as specified in IEEE Standard 802.11 Specification or its supplements.

* * * * *

UNITED STATES PATENT AND TRADEMARK OFFICE
CERTIFICATE OF CORRECTION

PATENT NO. : 7,177,637 B2 Page 1 of 1
APPLICATION NO. : 10/090136
DATED : February 13, 2007
INVENTOR(S) : Liu et al.

It is certified that error appears in the above-identified patent and that said Letters Patent is hereby corrected as shown below:

In column 3, at line 61, delete "is".

Signed and Sealed this

Twenty Second Day of April, 2008

JON W. DUDAS
*Director of the United States Patent and Trademark Office*